United States Patent
Ji

(10) Patent No.: US 10,671,456 B2
(45) Date of Patent: Jun. 2, 2020

(54) METHOD AND DEVICE FOR ACQUIRING APPLICATION INFORMATION

(71) Applicants: BEIJING QIHOO TECHNOLOGY COMPANY LIMITED, Beijing (CN); QIZHI SOFTWARE (BEIJING) COMPANY LIMITED, Beijing (CN)

(72) Inventor: Limin Ji, Beijing (CN)

(73) Assignees: BEIJING QIHOO TECHNOLOGY COMPANY LIMITED, Beijing (CN); QIZHI SOFTWARE (BEIJING) COMPANY LIMITED, Beijing (CN)

( * ) Notice: Subject to any disclaimer, the term of this patent is extended or adjusted under 35 U.S.C. 154(b) by 345 days.

(21) Appl. No.: 15/735,695

(22) PCT Filed: May 16, 2016

(86) PCT No.: PCT/CN2016/082228
§ 371 (c)(1),
(2) Date: Dec. 12, 2017

(87) PCT Pub. No.: WO2016/197786
PCT Pub. Date: Dec. 15, 2016

(65) Prior Publication Data
US 2020/0034217 A1    Jan. 30, 2020

(30) Foreign Application Priority Data

Jun. 12, 2015 (CN) .......................... 2015 1 0325598

(51) Int. Cl.
*G06F 9/54* (2006.01)

(52) U.S. Cl.
CPC .................. *G06F 9/543* (2013.01)

(58) Field of Classification Search
None
See application file for complete search history.

(56) References Cited

U.S. PATENT DOCUMENTS 5,343,409 A * 8/1994 Satterfield ............. G06F 9/4488
709/223
5,365,577 A * 11/1994 Davis .................. H04M 1/6505
379/93.17

(Continued)

FOREIGN PATENT DOCUMENTS

CN          1601483 A        3/2005
CN        101286118 A       10/2008
(Continued)

OTHER PUBLICATIONS

International Search Report dated Aug. 19, 2016 from the corresponding PCT Patent Application No. PCT/CN2016/082228.

*Primary Examiner* — Craig C Dorais

(57) ABSTRACT

Disclosed are a method and device for acquiring application information. The method comprises: when a mouse pointer is located on an application, monitoring an instruction for acquiring application information which is input by a user through a keyboard; matching the instruction input by the user with at least one pre-set instruction, and if the instruction input by the user is consistent with any one pre-set instruction among at least one pre-set instruction, then triggering a script program corresponding to the instruction input by the user to run in order to acquire the application information corresponding to the instruction input by the user; and converting the application information into text information, and inserting the text information into the clipboard.

19 Claims, 5 Drawing Sheets

(56) References Cited

U.S. PATENT DOCUMENTS

| | | | | |
|---|---|---|---|---|
| 5,557,732 A | * | 9/1996 | Thompson | G06F 21/53 715/705 |
| 6,020,886 A | * | 2/2000 | Jacober | G06F 9/453 715/709 |
| 2006/0168549 A1 | | 7/2006 | Chan et al. | |

FOREIGN PATENT DOCUMENTS

| | | |
|---|---|---|
| CN | 101340317 A | 1/2009 |
| CN | 101834807 A | 9/2010 |
| CN | 102830993 A | 12/2012 |
| CN | 102981757 A | 3/2013 |
| CN | 104133915 A | 11/2014 |
| CN | 104268006 A | 1/2015 |
| CN | 104965701 A1 | 10/2015 |

\* cited by examiner

METHOD AND DEVICE FOR ACQUIRING APPLICATION INFORMATION

CROSS REFERENCE TO RELATED APPLICATIONS

This application is a national stage application of International Application No. PCT/CN2016/082228 filed on May 16, 2016 which is based upon and claims priority to Chinese Patent Application No. 201510325598.6, filed in China on Jun. 12, 2015, the entire contents of which are incorporated herein by reference.

TECHNICAL FIELD

The disclosure relates to the technical field of Internet, and particularly to a method and device for acquiring application information.

BACKGROUND

Prior to publishing of an application program, it is first necessary to perform a test on the application program, which is mainly testing whether the application program can implement all or some of functions, so as to ensure that the application program can run correctly in a predetermined manner.

Taking a game application as an example, in one scenario, prior to publishing of the game application, it is necessary to test some information of the game application, such as version information, a publishing platform of an application program (whether it is anti-addiction), and the like; and after the test is passed, it is necessary to shield all debug information in order to publish a pure application program. However, since application information had been shielded prior to the publishing of the application program, after the publishing of the application program, a developer of the application program cannot acquire description information of the game application, and further cannot check whether the published application program is correct.

In another scenario, in the process where a user uses the game application, when the game user finds a problem occurring to his account, reporting of errors such as a game coin error or a game money amount error or a game weapon equipment error or the like can be performed through an error reporting function and the like provided by the game application. However, since the developer of the application program cannot acquire login passwords of the game user directly, the developer of the application program cannot simulate the game user's login to the game to verify whether an error occurs to the account of the game user. However, without simulating the login to the game in a state of the game user, it would be difficult to verify whether an error occurs.

SUMMARY

In view of the above problem, the disclosure is proposed to provide a method for acquiring application information and a corresponding device for acquiring application information which overcome the above problem or at least partially solve the above problem.

According to one aspect of the disclosure, there is provided a method for acquiring application information, comprising:

when a mouse pointer is located on an application, monitoring an instruction for acquiring application information which is input by a user through a keyboard;

matching the instruction input by the user with at least one pre-set instruction, and if the instruction input by the user is consistent with any one pre-set instruction among at least one pre-set instruction, then triggering a script program corresponding to the instruction input by the user to run in order to acquire the application information corresponding to the instruction input by the user; and converting the application information into text information, and inserting the text information into the clipboard.

According to another aspect of the disclosure, there is provided a device for acquiring application information, comprising:

one or more processors; and a memory;

wherein one or more programs are stored in the memory, and when executed by the one or more processors, the one or more programs cause the one or more processors to:

when a mouse pointer is located on an application, monitor an instruction for acquiring application information which is input by a user through a keyboard;

match the instruction input by the user with at least one pre-set instruction;

in a case where the instruction input by the user is consistent with any one pre-set instruction among at least one pre-set instruction, trigger a script program corresponding to the instruction input by the user to run in order to acquire the application information corresponding to the instruction input by the user;

convert the application information into text information; and insert the text information into the clipboard.

According to still another aspect of the disclosure, there is provided a non-transitory computer readable medium having computer programs stored thereon that, when executed by one or more processors of a computing device, cause the computing device to perform operations for acquiring application information, the operations comprising:

when a mouse pointer is located on an application, monitoring an instruction for acquiring application information which is input by a user through a keyboard;

matching instruction input by the user with at least one pre-set instruction, and if the instruction input by the user is consistent with any one pre-set instruction among at least one pre-set instruction, then triggering a script program corresponding to the instruction input by the user to run in order to acquire the application information corresponding to the instruction input by the user; and converting the application information into text information, and inserting the text information into the clipboard.

According to the solution provided by the disclosure, when a mouse pointer is located on an application, an instruction for acquiring application information which is input by a user through a keyboard is monitored. The instruction input by the user is matched with at least one pre-set instruction. This matching process is equivalent to adding an authentication process, so as to define a user acquiring the application information to be a user with administrative authority. If the instruction input by the user is consistent with any one pre-set instruction among at least one pre-set instruction, then a script program corresponding to the instruction input by the user is triggered to run in order to acquire the application information corresponding to the instruction input by the user. The application information is converted into text information, and the text information is inserted into the clipboard. On the one hand, the present solution provides a more convenient and efficient manner of viewing application information for the user with administrative authority; and on the other hand, since the text information will not be displayed on a display screen, other users without administrative authority can be prevented from viewing the acquired application information, so as to present a pure application program to the other users.

The above descriptions are only a brief summary of the technical solution of the disclosure. For more clear comprehension of these technical means, the disclosure may be carried out in accordance with the contents of the description; and to enable the above and other objects, features and advantages of the disclosure to be more apparent and intelligible, detailed embodiments of the disclosure are hereby provided below.

BRIEF DESCRIPTION OF THE DRAWINGS

By reading the detailed description of the preferably selected embodiments below, various other advantages and benefits become clear for a person of ordinary skill in the art. The drawings are only used for showing the purpose of the preferred embodiments and are not intended to limit the disclosure. And in the whole drawings, same drawing reference signs are used for representing same components. In the drawings.

DETAILED DESCRIPTION

Hereinafter, illustrative embodiments of the disclosure will be descried in more details with reference to accompanying drawings. Although the illustrative embodiments of the disclosure are shown in the accompanying drawings, it should be understood that the disclosure may be carried out in various forms but should not be limited by the embodiments described herein. Instead, these embodiments are provided for enabling the disclosure to be appreciated more thoroughly, and enabling the scope of the disclosure to be understood completely by a person skilled in the art.

Figure 1:
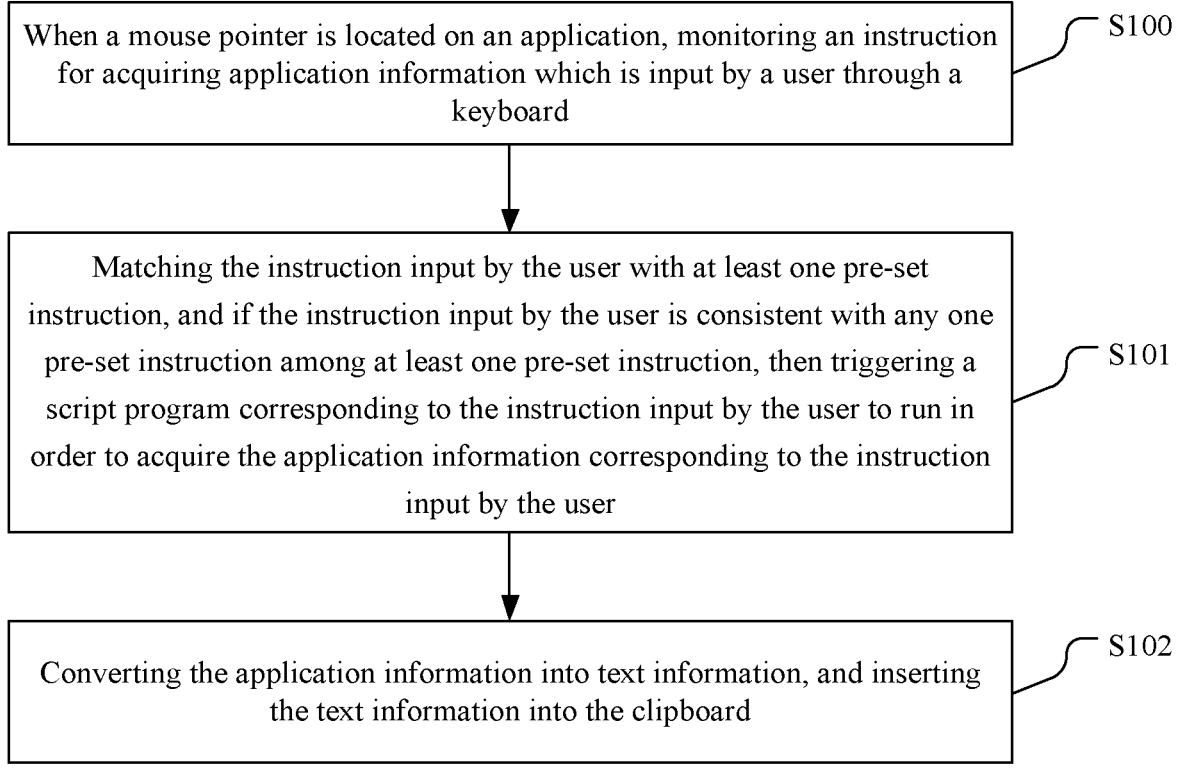
FIG. 1 shows a flow chart of a method for acquiring application information in accordance with one embodiment of the disclosure.

FIG. 1 shows a flow chart of a method for acquiring application information in accordance with one embodiment of the disclosure. As shown in FIG. 1, the method comprises the following steps:

Step S100: when a mouse pointer is located on an application, monitoring an instruction for acquiring application information which is input by a user through a keyboard.

Specifically, the user can determine, through a mouse, an application whose application information shall be acquired. For example, the user can, by sliding the mouse, cause a mouse pointer to be located on the application whose application information shall be acquired. When the mouse pointer is located on the application, the user can, through a keyboard, input an instruction for acquiring application information. In this step, the instruction for acquiring application information which is input by the user is monitored in order to judge the application information that shall be acquired by the user.

Step S101: matching the instruction input by the user with at least one pre-set instruction, and if the instruction input by the user is consistent with any one pre-set instruction among at least one pre-set instruction, then triggering a script program corresponding to the instruction input by the user to run in order to acquire the application information corresponding to the instruction input by the user.

Optionally, the application is encapsulated in advance with at least one pre-set instruction and a script program corresponding to each pre-set instruction, such as an instruction for acquiring application version information, an instruction for acquiring user login information and an instruction for acquiring error logs and the like. For different application information, instructions input by the user through the keyboard are different. The instruction input by the user which is monitored in step S100 is matched with at least one pre-set instruction stored in advance in order to judge whether the instruction input by the user matches with the at least one pre-set instruction stored in advance. If the instruction input by the user is consistent with any one pre-set instruction among at least one pre-set instruction, then a script program corresponding to the instruction input by the user is triggered to run wherein the script program has a function of acquiring application information, and the application information corresponding to the instruction input by the user can be acquired by running the script information. By matching the instruction input by the user with the at least one pre-set instruction, an authentication process is set, so as to define a user who acquires application information to be a user with administrative authority.

Step S102: converting the application information into text information, and inserting the text information into the clipboard.

According to the method provided by the above embodiment of the disclosure, when a mouse pointer is located on an application, an instruction for acquiring application information which is input by a user through a keyboard is monitored. The instruction input by the user is matched with at least one pre-set instruction. By adding an authentication process, a user who acquires application information is defined to be a user with administrative authority. If the instruction input by the user is consistent with any one pre-set instruction among at least one pre-set instruction, then a script program corresponding to the instruction input by the user is triggered to run in order to acquire the application information corresponding to the instruction input by the user. The application information is converted into text information, and then the text information is inserted into the clipboard. On the one hand, the present solution provides a more convenient and efficient manner of viewing application information for the user with administrative authority; and on the other hand, since the text information will not be displayed on a display screen, other users without administrative authority can be prevented from viewing the acquired application information, so as to present a pure application program to the other users.

Figure 2:
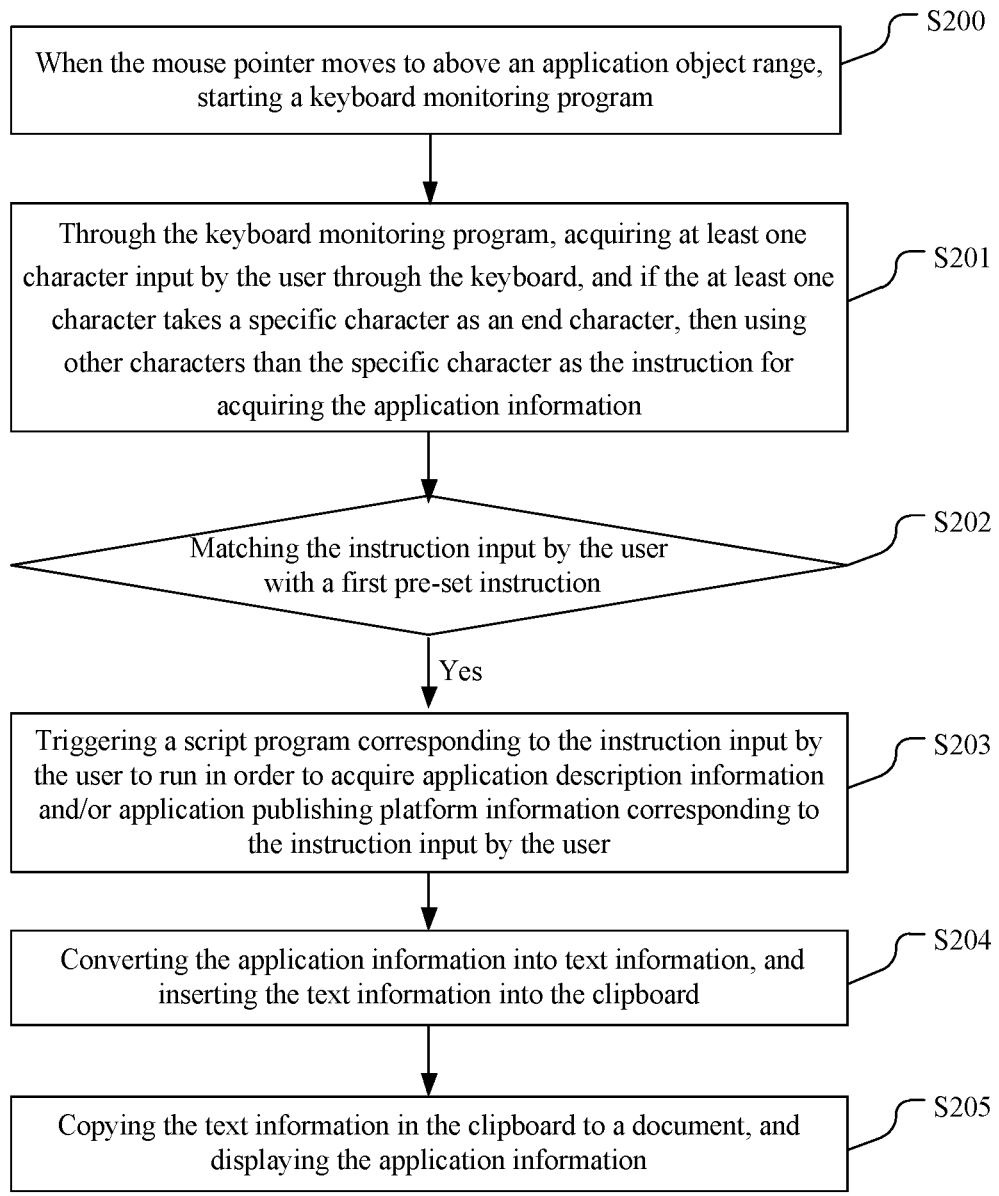
FIG. 2 shows a flow chart of a method for acquiring application information in accordance with another embodiment of the disclosure.

FIG. 2 shows a flow chart of a method for acquiring application information in accordance with another embodiment of the disclosure. In the present embodiment, the application is encapsulated in advance with at least one pre-set instruction and a script program corresponding to each pre-set instruction, the at least one pre-set instruction includes a first pre-set instruction, and a script program corresponding to the first pre-set instruction is used for acquiring application description information and/or application publishing platform information of the application, wherein the application information includes application version information, developer information and the like. As shown in FIG. 2, the method comprises the following steps:

Step S200: when the mouse pointer moves to above an application object range, starting a keyboard monitoring program.

When the mouse pointer moves onto an application, an onmouseover event is triggered, and upon detection of occurrence of the onmouseover event, a keyboard monitoring program is started for monitoring an input of the user.

Step S201: through the keyboard monitoring program, acquiring at least one character input by the user through the keyboard, and if the at least one character takes a specific character as an end character, then using other characters than the specific character as the instruction for acquiring the application information.

Specifically, an instruction for acquiring application version information which is input by the user through the keyboard may either be a character string arbitrarily composed of letters a-z or be an instruction composed of letters and numbers, which can be set by a person skilled in the art according to requirements and will not be specifically defined herein. To distinguish an input of an instruction by the user from playing of a game by the user using keystrokes, in this step, a specific character input by the user is taken as an end character; if it is monitored that the user inputs the specific character, it is indicated that the user inputs an instruction for acquiring application version information; and if it is not monitored that the user inputs the specific character, it is indicated that the user only plays a game using keystrokes, wherein the specific character may be "Enter", "Tab" and the like. As an example, if "Enter key" is taken as the end character, the user inputs a character "gamestate" through the keyboard, and thereafter the keyboard monitoring program monitors that the user has clicked the Enter key in the keyboard, then it can be determined that the user inputs an instruction for acquiring application version information, the instruction is composed of other characters than "Enter", and the instruction for acquiring application version information which is input by the user is: gamestate. In this step, no input box for inputting a character string is provided for the user, so the user cannot see the specific input content, thus ensuring the security of the input content.

Step S202: matching the instruction input by the user with a first pre-set instruction, wherein if the instruction input by the user is consistent with the first pre-set instruction, Step S203 is performed; and if the instruction input by the user is not consistent with the first pre-set instruction, the method ends.

The instruction input by the user through the keyboard which is acquired in Step S201 is matched with a first pre-set instruction; if the instruction input by the user matches with the first pre-set instruction, it is indicated that the instruction input by the user is correct, and the user shall acquire the application information corresponding to the instruction; and if the instruction input by the user does not match with the first pre-set instruction, it is indicated that the instruction input by the user is erroneous, and the application information cannot be provided for the user. By matching the instruction input by the user with the first pre-set instruction, an authentication process is set, so as to define a user who acquires application information to be a user with administrative authority.

Step S203: triggering a script program corresponding to the instruction input by the user to run in order to acquire application description information and/or application publishing platform information corresponding to the instruction input by the user.

In a case where the instruction input by the user matches with the first pre-set instruction, a script program corresponding to the instruction for acquiring application description information and/or application publishing platform information which is input by the user is triggered to run. Application description information and/or application publishing platform information of the application can be obtained after the script is run, and whether a version, an application publishing platform and the like of the published application are correct can be queried according to the acquired application description information and/or application publishing platform information, wherein the application description information includes version information, developer information and the like of the application.

Step S204: converting the application information into text information, and inserting the text information into the clipboard.

In this step, the text information is inserted into the clipboard. Since the text information will not be displayed on a display screen, other users can be prevented from seeing the application information, so as to protect the privacy of the user.

Step S205: copying the text information in the clipboard to a document, and displaying the application information.

By copying the text information in the clipboard to a document, the user is made to view the corresponding application information.

According to the method provided by the above embodiment of the disclosure, when the mouse pointer moves to above an application object range, a keyboard monitoring program is started. Through the keyboard monitoring program, at least one character input by the user through the keyboard is acquired. If the at least one character takes a specific character as an end character, then other characters than the specific character are used as the instruction for acquiring the application information. By distinguishing an input of an instruction by the user from playing of a game by the user using keystrokes, the instruction input by the user is matched with a first pre-set instruction. By matching the instruction input by the user with the first pre-set instruction, an authentication process is set, so as to define a user who acquires application information to be a user with administrative authority. If the instruction input by the user is consistent with the first pre-set instruction, a script program corresponding to the instruction input by the user is triggered to run in order to acquire the application information corresponding to the instruction input by the user, and the text information is inserted into the clipboard. Since the text information will not be displayed on a display screen, other users without administrative authority can be prevented from seeing the acquired application information, so as to present a pure application program to the other users.

Figure 3:
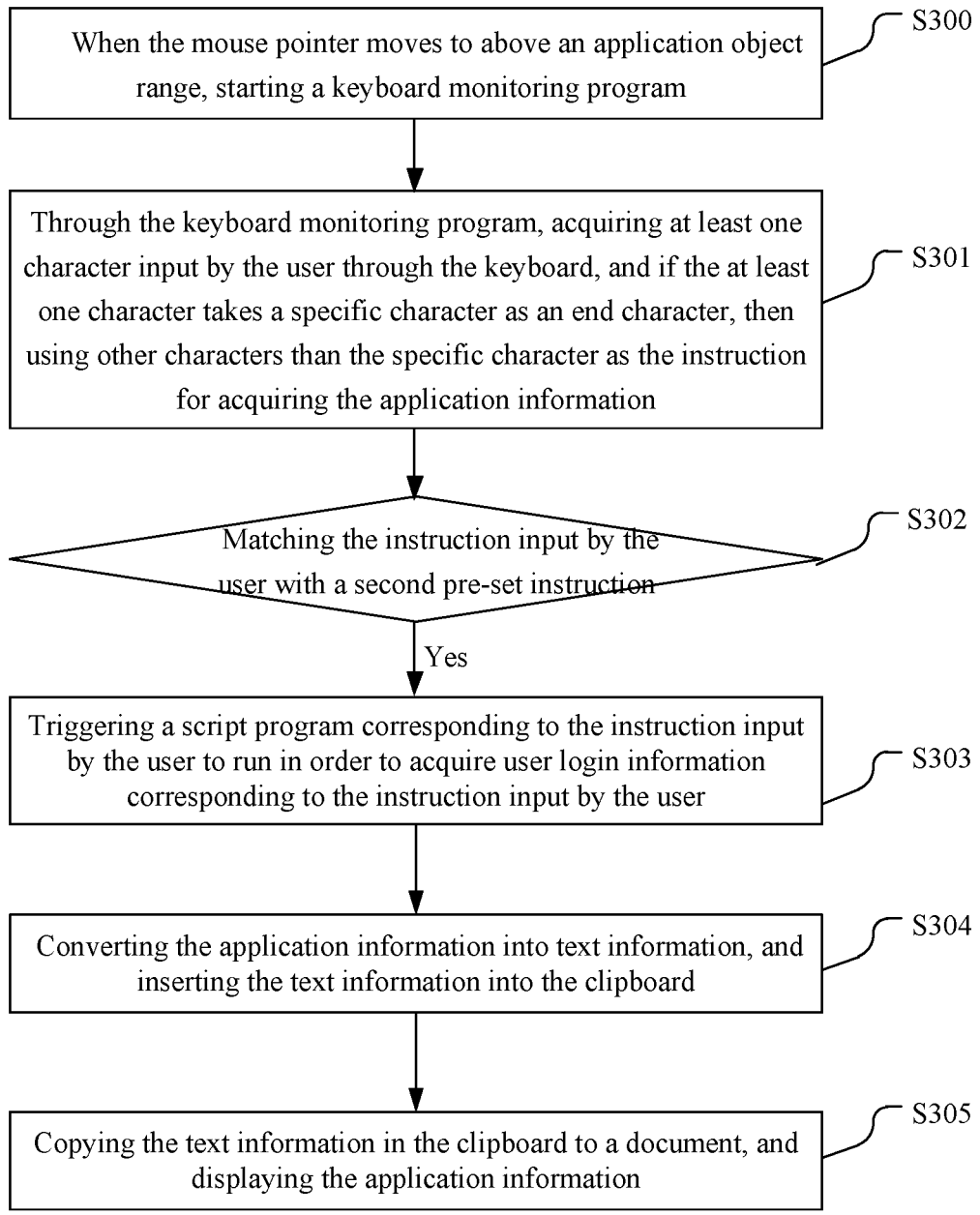
FIG. 3 shows a flow chart of a method for acquiring application information in accordance with another embodiment of the disclosure.

FIG. 3 shows a flow chart of a method for acquiring application information in accordance with another embodiment of the disclosure. In the present embodiment, the application is encapsulated in advance with at least one pre-set instruction and a script program corresponding to each pre-set instruction, the at least one pre-set instruction includes a second pre-set instruction, and a script program corresponding to the second pre-set instruction is used for acquiring user login information, or user login information and error logs; wherein the user login information includes a user terminal hardware address and a user identity authentication character string. In the present embodiment, acquiring user login information corresponding to the second instruction by the user is taken as an example. As shown in FIG. 3, the method comprises the following steps:

Step S300: when the mouse pointer moves to above an application object range, starting a keyboard monitoring program.

When the mouse pointer moves onto an application, an onmouseover event is triggered, and upon detection of occurrence of the onmouseover event, a keyboard monitoring program is started for monitoring an input of the user.

Step S301: through the keyboard monitoring program, acquiring at least one character input by the user through the keyboard, and if the at least one character takes a specific character as an end character, then using other characters than the specific character as the instruction for acquiring the application information.

Specifically, an instruction for acquiring user login information which is input by the user through the keyboard may either be a character string arbitrarily composed of letters a-z or be an instruction composed of letters and numbers, which can be set by a person skilled in the art according to requirements and will not be specifically defined herein. To distinguish an input of an instruction by the user from playing of a game by the user using keystrokes, in this step, a specific character input by the user is taken as an end character; if it is monitored that the user inputs the specific character, it is indicated that the user inputs an instruction for acquiring user login information; and if it is not monitored that the user inputs the specific character, it is indicated that the user only plays a game using keystrokes, wherein the specific character may be "Enter", "Tab" and the like. As an example, if "Enter key" is taken as the end character, the user inputs a character "get QT" through the keyboard, and thereafter the keyboard monitoring program monitors that the user has clicked the Enter key in the keyboard, then it can be determined that the user inputs an instruction for acquiring user login information, the instruction is composed of other characters than "Enter", and the instruction for acquiring user login information which is input by the user is: get QT. In this step, no input box for inputting a character string is provided for the user, so the user cannot see the specific input content, thus ensuring the security of the input content.

Step S302: matching the instruction input by the user with a second pre-set instruction, wherein if the instruction input by the user is consistent with the second pre-set instruction, Step S303 is performed; and if the instruction input by the user is not consistent with the second pre-set instruction, the method ends.

The instruction input by the user through the keyboard which is acquired in Step S301 is matched with a second pre-set instruction; if the instruction input by the user matches with the second pre-set instruction, it is indicated that the instruction input by the user is correct, and the user shall acquire the user login information corresponding to the instruction; and if the instruction input by the user does not match with the second pre-set instruction, it is indicated that the instruction input by the user is erroneous, and the user login information cannot be provided for the user. By matching the instruction input by the user with the second pre-set instruction, an authentication process is set, so as to define a user who acquires application information to be a user with administrative authority.

Step S303: triggering a script program corresponding to the instruction input by the user to run in order to acquire user login information corresponding to the instruction input by the user.

In a case where the instruction input by the user matches with the second pre-set instruction, a script program corresponding to the instruction for acquiring user login information which is input by the user is triggered to run. A user terminal hardware address and a user identity authentication character string can be obtained after the script is run, wherein the user identity authentication character string is obtained by encrypting a login name and passwords of the user using MD5 encryption algorithm according to user reporting time, and the user identity authentication character string has timeliness, that is, the user identity authentication character string is invalidated after a pre-set period of time is exceeded, so as to prevent other users from simulating the user's login to a game application with use of the acquired user identity authentication character string for an infinite number of times. The login name and the passwords of the user are encrypted according to the reporting time of the user to obtain the user identity authentication character string, so as to avoid a leak of the passwords of the user, thus enhancing the security.

Step S304: converting the application information into text information, and inserting the text information into the clipboard.

In this step, the text information is inserted into the clipboard. Since the text information will not be displayed on a display screen, other users can be prevented from seeing the application information, so as to protect the privacy of the user.

Step S305: copying the text information in the clipboard to a document, and displaying the application information.

By copying the text information in the clipboard to a document, the user is made to view the corresponding application information.

After the application information is acquired by the above method, the game user may send the application information in the document to the developer of the application program, and the developer of the application program simulates login to the account of the game user using the application information sent by the game user, so as to query whether a problem occurs to the game at that time.

According to the method provided by the above embodiment of the disclosure, when the mouse pointer moves to above an application object range, a keyboard monitoring program is started. Through the keyboard monitoring program, at least one character input by the user through the keyboard is acquired. If the at least one character takes a specific character as an end character, then other characters than the specific character are used as the instruction for acquiring the application information. By distinguishing an input of an instruction by the user from playing of a game by the user using keystrokes, the instruction input by the user is matched with a second pre-set instruction. By matching the instruction input by the user with the second pre-set instruction, an authentication process is set, so as to define a user who acquires application information to be a user with administrative authority. If the instruction input by the user is consistent with the second pre-set instruction, a script program corresponding to the instruction input by the user is triggered to run in order to acquire the application information corresponding to the instruction input by the user, and the text information is inserted into the clipboard. Since the text information will not be displayed on a display screen, other users without administrative authority can be prevented from seeing the acquired application information, so as to protect the privacy of the user. The acquired user login information can be used for other users to simulate the user's login to the application, so as to query whether an error occurs to the application.

Figure 4:
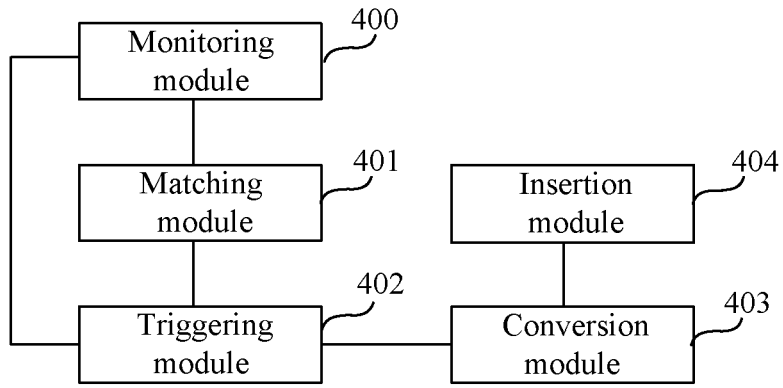
FIG. 4 shows a structural block diagram of a device for acquiring application information in accordance with one embodiment of the disclosure.

FIG. 4 shows a structural block diagram of a device for acquiring application information in accordance with one embodiment of the disclosure. As shown in FIG. 4, the device comprises: a monitoring module 400, a matching module 401, a triggering module 402, a conversion module 403, and an insertion module 404.

The monitoring module 400 is adapted to, when a mouse pointer is located on an application, monitor an instruction for acquiring application information which is input by a user through a keyboard.

The matching module 401 is adapted to match the instruction input by the user with at least one pre-set instruction.

The triggering module 402 is adapted to, in a case where the instruction input by the user is consistent with any one pre-set instruction among at least one pre-set instruction, trigger a script program corresponding to the instruction input by the user to run in order to acquire the application information corresponding to the instruction input by the user The conversion module 403 is adapted to convert the application information into text information.

The insertion module 404 is adapted to insert the text information into the clipboard.

According to the device provided by the above embodiment of the disclosure, when a mouse pointer is located on an application, an instruction for acquiring application information which is input by a user through a keyboard is monitored. The instruction input by the user is matched with at least one pre-set instruction. By adding an authentication process, a user who acquires application information is defined to be a user with administrative authority. If the instruction input by the user is consistent with any one pre-set instruction among at least one pre-set instruction, then a script program corresponding to the instruction input by the user is triggered to run in order to acquire the application information corresponding to the instruction input by the user. The application information is converted into text information, and the text information is inserted into the clipboard. Since the text information will not be displayed on a display screen, other users without administrative authority can be prevented from viewing the acquired application information, so as to present a pure application program to the other users.

Figure 5:
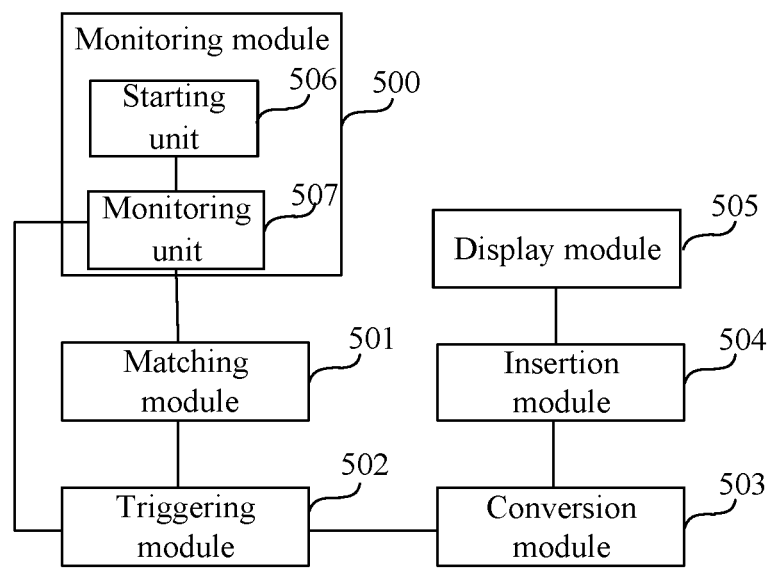
FIG. 5 shows a structural block diagram of a device for acquiring application information in accordance with another embodiment of the disclosure.

FIG. 5 shows a structural block diagram of a device for acquiring application information in accordance with another embodiment of the disclosure. As shown in FIG. 5, the device comprises: a monitoring module 500, a matching module 501, a triggering module 502, a conversion module 503, and an insertion module 504.

The monitoring module 500 is adapted to, when a mouse pointer is located on an application, monitor an instruction for acquiring application information which is input by a user through a keyboard.

Wherein, the application is encapsulated in advance with at least one pre-set instruction and a script program corresponding to each pre-set instruction. The at least one pre-set instruction includes a first pre-set instruction and a second pre-set instruction. A script program corresponding to the first pre-set instruction is used for acquiring application description information and/or application publishing platform information of the application; and a script program corresponding to the second pre-set instruction is used for acquiring user login information, or user login information and error logs; wherein the user login information includes a user terminal hardware address and a user identity authentication character string.

The monitoring module 500 further comprises: a starting unit 506 and a monitoring unit 507.

The starting unit 506 is adapted to, when the mouse pointer moves to above an application object range, starting a keyboard monitoring program.

The monitoring unit 507 is adapted to, through the keyboard monitoring program, acquire at least one character input by the user through the keyboard, and if the at least one character takes a specific character as an end character, then use other characters than the specific character as the instruction for acquiring the application information.

The matching module 501 is adapted to match the instruction input by the user with at least one pre-set instruction.

The triggering module 502 is adapted to, in a case where the instruction input by the user is consistent with any one pre-set instruction among at least one pre-set instruction, trigger a script program corresponding to the instruction input by the user to run in order to acquire the application information corresponding to the instruction input by the user.

The conversion module 503 is adapted to convert the application information into text information.

The insertion module 504 is adapted to insert the text information into the clipboard.

The device further comprises: a display module 505 adapted to copy the text information in the clipboard to a document and display the application information.

According to the device provided by the above embodiment of the disclosure, when the mouse pointer moves to above an application object range, a keyboard monitoring program is started. Through the keyboard monitoring program, at least one character input by the user through the keyboard is acquired. If the at least one character takes a specific character as an end character, then other characters than the specific character are used as the instruction for acquiring the application information. By distinguishing an input of an instruction by the user from playing of a game by the user using keystrokes, the instruction input by the user is matched with a first pre-set instruction. By matching the instruction input by the user with at least one pre-set instruction, an authentication process is set, so as to define a user who acquires application information to be a user with administrative authority. If the instruction input by the user is consistent with any one pre-set instruction among at least one pre-set instruction, a script program corresponding to the instruction input by the user is triggered to run in order to acquire the application information corresponding to the instruction input by the user, and the text information is inserted into the clipboard. Since the text information will not be displayed on a display screen, other users without administrative authority can be prevented from seeing the acquired application information, so as to protect the privacy of the user. The acquired user login information can be used for other users to simulate the user's login to the application, so as to query whether an error occurs to the application.

The algorithm and display provided here have no inherent relation with any specific computer, virtual system or other devices. Various general-purpose systems can be used together with the teaching based on this. According to the description above, the structure required to construct this kind of system is obvious. Besides, the disclosure is not directed at any specific programming language. It should be understood that various programming language can be used for achieving the content of the disclosure described here, and above description of specific language is for disclosing the optimum embodiment of the disclosure.

The description provided here explains plenty of details. However, it can be understood that the embodiments of the disclosure can be implemented without these specific details. The known methods, structure and technology are not shown in detail in some embodiments, so as not to obscure the understanding of the description.

Similarly, it should be understood that in order to simplify the disclosure and help to understand one or more of the various aspects of the disclosure, the various features of the disclosure are sometimes grouped into a single embodiment, drawing, or description thereof. However, the method disclosed should not be explained as reflecting the following intention: that is, the disclosure sought for protection claims more features than the features clearly recorded in every claim. To be more precise, as is reflected in the following claims, the aspects of the disclosure are less than all the features of a single embodiment disclosed before. Therefore, the claims complying with a specific embodiment are explicitly incorporated into the specific embodiment thereby, wherein every claim itself as an independent embodiment of the disclosure.

Those skilled in the art can understand that adaptive changes can be made to the modules of the devices in the embodiment and the modules can be installed in one or more devices different from the embodiment. The modules or units or elements in the embodiment can be combined into one module or unit or element, and furthermore, they can be separated into more sub-modules or sub-units or sub-elements. Except such features and/or process or that at least some in the unit are mutually exclusive, any combinations can be adopted to combine all the features disclosed by the description (including the attached claims, abstract and figures) and any method or all process of the device or unit disclosed as such. Unless is otherwise explicit statement, every feature disclosed by the present description (including the attached claims, abstract and figures) can be replaced by substitute feature providing the same, equivalent or similar purpose.

In addition, a person skilled in the art can understand that although some embodiments described here comprise some features instead of other features included in other embodiments, the combination of features of different embodiments means falling into the scope of the disclosure and forming different embodiments. For example, in the following claims, any one of the embodiments sought for protection can be used in various combination modes.

The various components embodiments of the disclosure can be realized by hardware, or realized by software modules running on one or more processors, or realized by combination thereof. A person skilled in the art should understand that microprocessor or digital signal processor (DSP) can be used for realizing some or all functions of some or all components of the device for acquiring application information according to the embodiments in the disclosure in practice. The disclosure can also realize one part of or all devices or system programs (for example, computer programs and computer program products) used for carrying out the method described here. Such programs for realizing the disclosure can be stored in computer readable medium, or can possess one or more forms of signal. Such signals can be downloaded from the Internet website or be provided at signal carriers, or be provided in any other forms.

Figure 6:
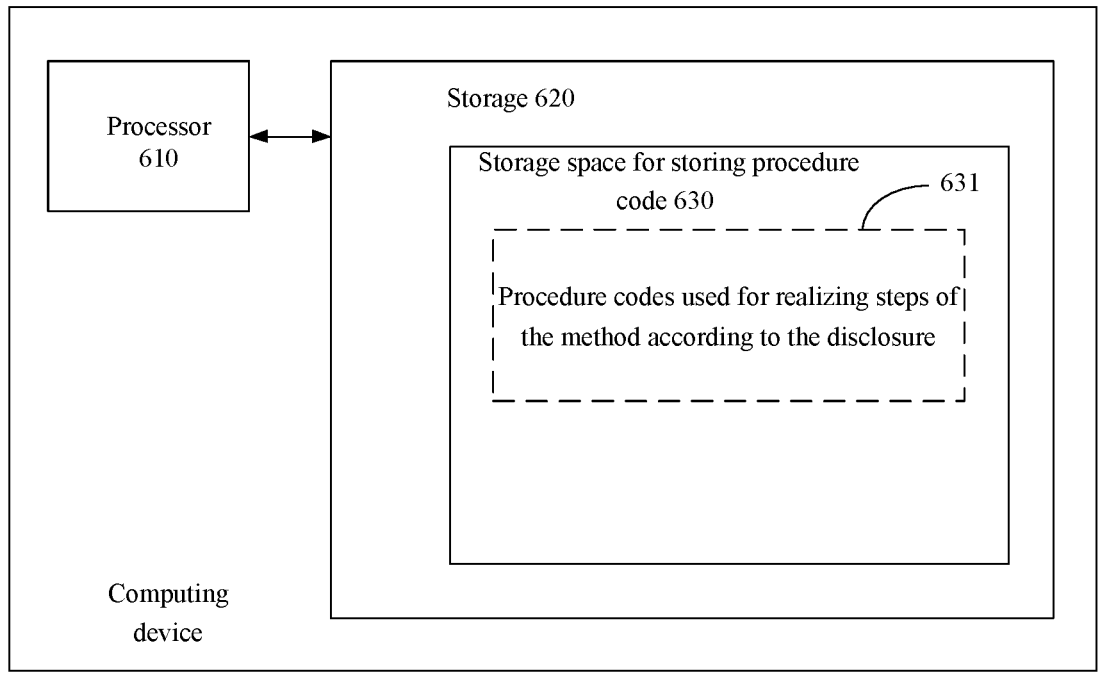
FIG. 6 schematically shows a block diagram of a computing device for implementing the method for acquiring application information in accordance with the embodiment of the disclosure.
Figure 7:
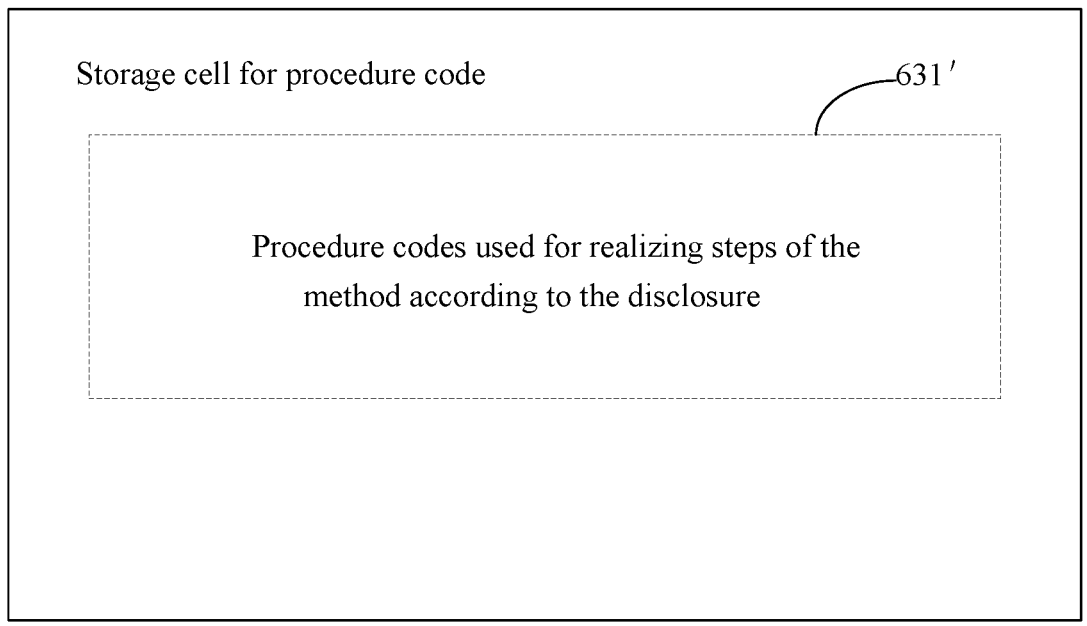
FIG. 7 schematically shows a storage unit for holding or carrying a program code for implementing the method for acquiring application information in accordance with the embodiment of the disclosure.

For example, FIG. 6 shows a computing device capable of implementing the method for acquiring application information according to the disclosure. The computing device traditionally comprises a processor 610 and a computer program product in the form of storage 620 or a computer readable medium. The storage 620 can be electronic storage such as flash memory, EEPROM (Electrically Erasable Programmable Read-Only Memory), EPROM, hard disk or ROM, and the like. The storage 620 possesses storage space 630 for carrying out procedure code 631 of any steps of aforesaid method. For example, storage space 630 for procedure code can comprise various procedure codes 631 used for realizing any steps of aforesaid method. These procedure codes can be read out from one or more computer program products or write in one or more computer program products. The computer program products comprise procedure code carriers such as hard disk, Compact Disc (CD), memory card or floppy disk and the like. These computer program products usually are portable or fixed storage cell as said in FIG. 7. The storage cell can possess memory paragraph, storage space like the storage 620 in the computing device in FIG. 6. The procedure code can be compressed in, for example, a proper form. Generally, storage cell comprises computer readable code 631' for implementing the steps of the method according to the disclosure, i.e. the code can be read by processors such as 610 and the like. When the codes run on a computer device, the computer device will carry out various steps of the method described above It should be noticed that the embodiments are intended to illustrate the disclosure and not limit this disclosure, and a person skilled in the art can design substitute embodiments without departing from the scope of the appended claims. In the claims, any reference marks between brackets should not be constructed as limit for the claims. The word "comprise" does not exclude elements or steps that are not listed in the claims. The word "a" or "one" before the elements does not exclude that more such elements exist. The disclosure can be realized by means of hardware comprising several different elements and by means of properly programmed computer. In the unit claims several devices are listed, several of the systems can be embodied by a same hardware item. The use of words first, second and third does not mean any sequence. These words can be explained as name.

What is claimed is:

1. A method for acquiring application information, comprising:
when a mouse pointer is located on an application, monitoring an instruction for acquiring application information which is input by a user through a keyboard;
matching the instruction input by the user with at least one pre-set instruction, and if the instruction input by the user is consistent with any one pre-set instruction among at least one pre-set instruction, then triggering a script program corresponding to the instruction input by the user to run in order to acquire the application information corresponding to the instruction input by the user; and converting the application information into text information, and inserting the text information into the clipboard.

2. The method according to claim 1, wherein when a mouse pointer is located on an application, monitoring an instruction for acquiring application information which is input by a user through a keyboard further comprises:

when the mouse pointer moves to above an application object range, starting a keyboard monitoring program; and through the keyboard monitoring program, acquiring at least one character input by the user through the keyboard, and if the at least one character takes a specific character as an end character, then using other characters than the specific character as the instruction for acquiring the application information.

3. The method according to claim 1, wherein the application is encapsulated in advance with at least one pre-set instruction and a script program corresponding to each pre-set instruction.

4. The method according to claim 2, wherein the application is encapsulated in advance with at least one pre-set instruction and a script program corresponding to each pre-set instruction.

5. The method according to claim 3, wherein the at least one pre-set instruction includes a first pre-set instruction, and a script program corresponding to the first pre-set instruction is configured to acquire application description information and/or application publishing platform information of the application.

6. The method according to claim 4, wherein the at least one pre-set instruction includes a first pre-set instruction, and a script program corresponding to the first pre-set instruction is configured to acquire application description information and/or application publishing platform information of the application.

7. The method according to claim 3, wherein the at least one pre-set instruction includes a second pre-set instruction, and a script program corresponding to the second pre-set instruction is configured to acquire user login information, or user login information and error logs; wherein the user login information includes a user terminal hardware address and a user identity authentication character string.

8. The method according to claim 4, wherein the at least one pre-set instruction includes a second pre-set instruction, and a script program corresponding to the second pre-set instruction is configured to acquire user login information, or user login information and error logs; wherein the user login information includes a user terminal hardware address and a user identity authentication character string.

9. The method according to claim 1, the method further comprising:

copying the text information in the clipboard to a document, and displaying the application information.

10. A device for acquiring application information, comprising:

one or more processors; and
a memory;
wherein one or more programs are stored in the memory, and when executed by the one or more processors, the one or more programs cause the one or more processors to:

when a mouse pointer is located on an application, monitor an instruction for acquiring application information which is input by a user through a keyboard;

match the instruction input by the user with at least one pre-set instruction;

in a case where the instruction input by the user is consistent with any one pre-set instruction among at least one pre-set instruction, trigger a script program corresponding to the instruction input by the user to run in order to acquire the application information corresponding to the instruction input by the user;

convert the application information into text information; and insert the text information into the clipboard.

11. The device according to claim 10, wherein the one or more processors are further caused to:

when the mouse pointer moves to above an application object range, start a keyboard monitoring program; and through the keyboard monitoring program, acquire at least one character input by the user through the keyboard, and if the at least one character takes a specific character as an end character, then use other characters than the specific character as the instruction for acquiring the application information.

12. The device according to claim 10, wherein the application is encapsulated in advance with at least one pre-set instruction and a script program corresponding to each pre-set instruction.

13. The device according to claim 11, wherein the application is encapsulated in advance with at least one pre-set instruction and a script program corresponding to each pre-set instruction.

14. The device according to claim 12, wherein the at least one pre-set instruction includes a first pre-set instruction, and a script program corresponding to the first pre-set instruction is configured to acquire application description information and/or application publishing platform information of the application.

15. The device according to claim 13, wherein the at least one pre-set instruction includes a first pre-set instruction, and a script program corresponding to the first pre-set instruction is configured to acquire application description information and/or application publishing platform information of the application.

16. The device according to claim 12, wherein the at least one pre-set instruction includes a second pre-set instruction, a script program corresponding to the second pre-set instruction is configured to acquire user login information, or user login information and error logs; wherein the user login information includes a user terminal hardware address and a user identity authentication character string.

17. The device according to claim 13, wherein the at least one pre-set instruction includes a second pre-set instruction, a script program corresponding to the second pre-set instruction is configured to acquire user login information, or user login information and error logs; wherein the user login information includes a user terminal hardware address and a user identity authentication character string.

18. The device according to claim 10, wherein the one or more processors are further caused to: copy the text information in the clipboard to a document and display the application information.

19. A non-transitory computer readable medium having computer programs stored thereon that, when executed by one or more processors of a computing device, cause the computing device to perform operations for acquiring application information, the operations comprising:

when a mouse pointer is located on an application, monitoring an instruction for acquiring application information which is input by a user through a keyboard;

matching the instruction input by the user with at least one pre-set instruction, and if the instruction input by the user is consistent with any one pre-set instruction among at least one pre-set instruction, then triggering a script program corresponding to the instruction input by the user to run in order to acquire the application information corresponding to the instruction input by the user; and converting the application information into text information, and inserting the text information into the clipboard.

* * * * *